Dec. 15, 1970 G. RETHMEIER 3,546,798

TAGS AND METHOD OF PRODUCING THE SAME

Filed Jan. 29, 1968 2 Sheets-Sheet 1

Inventor:
Gerhard Rethmeier

TAGS AND METHOD OF PRODUCING THE SAME

Filed Jan. 29, 1968 2 Sheets-Sheet 2

Inventor:

Gerhard Rethmeier

United States Patent Office 3,546,798

Patented Dec. 15, 1970

3,546,798

TAGS AND METHOD OF PRODUCING THE SAME

Gerhard Rethmeier, Oldentrup, Germany, assignor to Anker-Werke Aktiengesellschaft Bielefeld, Germany, a corporation of Germany Filed Jan. 29, 1968, Ser. No. 701,431
Claims priority, application Germany, Jan. 27, 1967, A 54,729
Int. Cl. A44c 3/00
U.S. Cl. 40—2 4 Claims

ABSTRACT OF THE DISCLOSURE

Method of producing multisegment tags having indicia thereon that can be read both visually and by machine, which includes tying together with a exible loop adjacent segments of tag blanks connected to one another in a continuous strip, thereafter inserting the strip into an indicia marking mechanism and performing at least one marking operation on the adjacent segments of the tag blanks, and severing the marked tag blank segments from one another and from the segments of the adjoining tag blanks in the strip.

Figure 1:
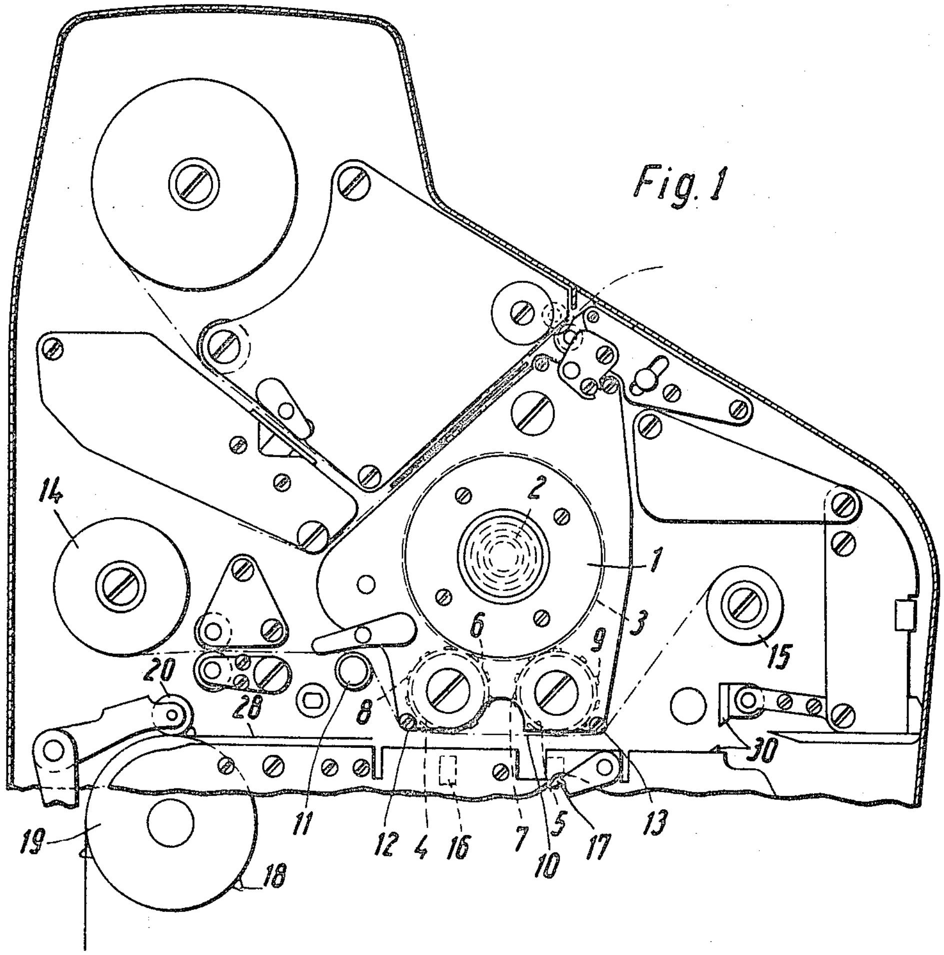

My invention relates to method of producing tags and more particularly, multisegment tags having indicia thereon that are readable visually and by machine.

When reading tags, for example for the direct accounting of sales operations, to determine the turnover or sales during a specific period of time or to take inventory at the end of a year, tag readers cooperating with registering machines have recently been employed. The tag readers feel or sense markings that are machanically applied to the tags in the form of holes or embossments and read tags to which magnetic indicia or labeling in the form of visual and machine-readable characters have been applied.

Modern and up-to-date merchandise sales organizations prepare vouchers for control purposes for each functional group (sales person, packing table, cash register, customer) of the category of persons in charge of these operations, the vouchers being in the form of tags subdivided into various severable segments and attached to the merchandise.

During the sales transaction, the corresponding segments are separated and are retained as receipts at the respective locations at which the operations take place, the last segment remaining either on the merchandise proper or being handed to the purchaser.

Since the segments of the tags remaining at the cash register are ordinarily read by machine, they must meet specific requirements as to form. Accurate orientation of a tag which is to be read by machine is a prerequiste in order that the sensing or reading members (electronic-optional reading machines and the like) can fullfil their intended function in a satisfying manner, that is without error.

It is an object of my invention to provide method of producing tags of the aforementioned type which is an improvement over heretofore known methods of production thereof.

With the foregoing and other objects in view, I provide in accordance with my invention method of producing multisegment tags which are attached by a string, cord, twine or the like, to the merchandise and are provided with information thereon in the form of suitable indicia by means of suitable price-marking machines or the like.

In accordance with my method, I produce multisegment tags having a form and structure suitable for machine-reading requirements. The segments that are to be read have two parallel edges which are disposed substantially perpendicular to a third edge and permit an accurate orientation of the respective segment.

Accordingly, my method of producing multisegment tags having indicia thereon that can be read both visually and by machine includes tying together with a flexible strand, such as cord, string or twine or the like, adjacent segments of tag blanks connected to one another in a continuous strip, thereafter inserting the strip into an indicia-marking mechanism such as the printing mechanism of a suitable marking or labeling machine and performing at least one marking operation on the adjacent segments of the tag blanks, and severing the marked tag blank segments from one another and from the segments of the adjoining tag blanks in the strip.

In accordance with a further feature of the invention, the strip of tag blanks is formed with an open slot at one of the laterial edges thereof and extending in the direction of a line along which the segments are respectively severed from the strip, transport holes being also spaced along that line. Both adjacent segments of each of the tag blanks are thus separated from one another by a severing member after being marked but remain connected to one another by means of the flexible strand.

Other features which are considered as characteristic for the invention are set forth in the appended claims.

Although the invention is illustrated and described herein as method of producing tags, it is nevertheless not intended to be limited to the details shown, since various modifications may be made therein without departing from the spirit of the invention and within the scope and range of equivalents of the claims.

Figure 2:
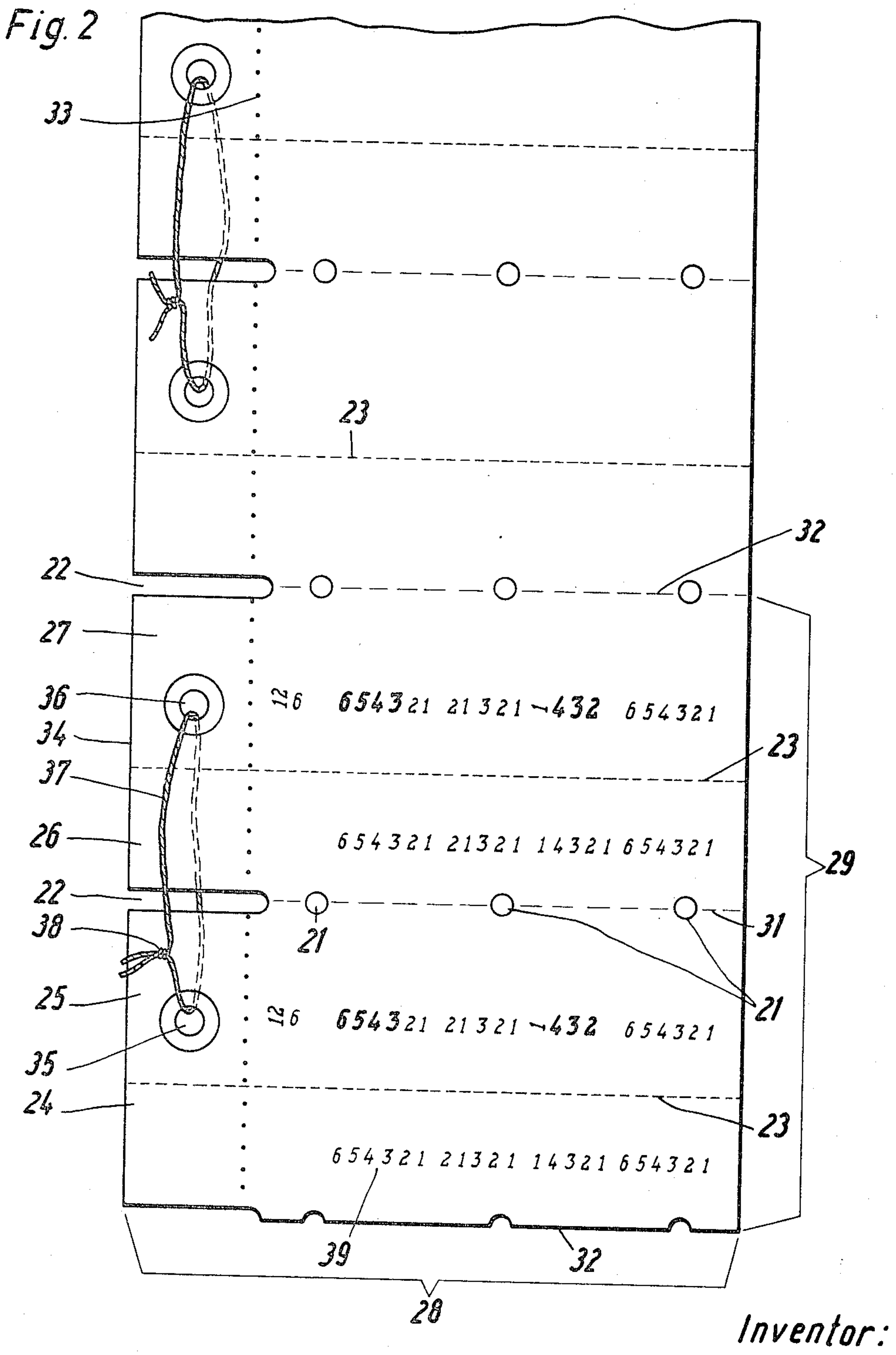

The method of the invention, however, together with additional objects and advantages thereof will be best understood from the following description when read in connection with the accompanying drawings, in which:

FIG. 1 is a front elevational view of the marking or printing mechanism of the marking or labeling machine employed in the method of my invention, with the housing thereof shown in cross section; and FIG. 2 is a plan view of a strip of multisegment tags produced in accordance with my invention.

Referring now to the drawings and first particularly to FIG. 1 thereof, there is shown a price marking or labeling machine of generally conventional construction provided with a marking or printing mechanism 1 having a tubular shaft system with tubular shafts 2 that are adjustable in a known manner through suitable control mechanisms from the keys and the adding or storage mechanisms of the labeling machine. Gears 3 are mounted on the individual tubular shafts 2 and mesh with the cog wheels 4 and 5 of the printing or type wheels 6 and 7 of which the type wheel 6 is equipped with conventional type 8 and the type wheel 7, with special type 9, which produce printing that is machine-readable. Beneath the type wheels 6 and 7, a special inking ribbon 10 is passed over the shaft 11 and the guide rods 12 and 13, and is unwound from a spool 15 onto a spool 14 in a known manner by a non-illustrated conventional inking ribbon control mechanism.

The type wheels 6 and 7 cooperate with the printing hammers 16 and 17 which are controlled in a conventional manner during the printing operation.

A tag strip 28 (FIG. 2) formed with transport punch holes 21 and with laterally disposed slots 22 as well as with linear perforations 23, for separating the strip 28 into individual segments 24 to 27, is fed toward the type wheels 6 and 7 of the printing mechanism 1 (FIG. 1) over a transport roller 19 (FIG. 1) driven by the price marking machine and provided with transport teeth 18 engaging in the transport holes 21 formed in the strip 28.

During the printing operation proper, the tag segments 24 and 25 are initially imprinted by the type wheels 7 and 6 respectively, by the simultaneous actuation of the printing hammers 16 and 17. The transport roller 19 then advances the tag strip 28 a distance corresponding to the peripheral spacing on the transport roller 19 between the teeth 18 thereof and, in fact, so far that the severing device 30 separates the tag segments 24, 25 from the segments 26, 27 in a severing operation along a line 31 shown by dashes in FIG. 2 whereon the transport punch holes 21 and the lateral slot 22 are located.

After the severing operation, the operation of imprinting both segments 26 and 27 of the multisegment tag 29 takes place, the tag 29 having been advanced to a position beneath the type wheels 6 and 7 due to the feed of one peripheral division between the teeth 18 on the transport roller 19. Thereafter, both tag segments 26 and 27 are further advanced a distance corresponding to another peripheral division between the teeth 18 of the roller 19 and are separated from the rest of the tag strip 28 by a slice or cut taken along the broken line 32.

The tag segments 25 and 27 are provided, between a longitudinal line of perforations 33 along the tag strip 28 and the lateral edge 34 of the strip 28, with a respective hole 35, 36, which is preferably provided with marginal reinforcement. A flexible strand 37 such as a cord or length of twine or the like is threaded through these holes 35, 36 of respectively four tag portions 24 to 27 which are correlated, the ends of the flexible strand 37 being tied together in a knot 38. The strand 37, after the slots 22 and the holes 35 and 36 have been stamped out and the linear perforations 23 formed in the tag strip 28, are threaded preferably by machine through the holes 35, 36 and knotted, and the thus prepared tag strip 28 is used in the aforedescribed manner in the form of a roll, for further processing at the price marking or labeling machine. The longitudinal line of perforations 33 facilitates the tearing or slicing off of the individual segments. The length 31, 32 to be severed is shortened by the lateral open-ended slot 22 and thereby avoids damage to the knotted flexible strand 37 by the severing device 30.

By connecting several correlated tag segments 24 to 27 with a flexible strand 37, the severing operation can be carried out after each individual printing operation without necessitating time-consuming gathering up and collection of the segments 24, 25 and 26, 27, which form each of the multisegment tags 29, after they have been severed from the strip 28 and have been piled up, because these operations take place automatically in rapid sequence.

It is also advantageous that the severing device 30 of the price marking or labeling machine does not have to be repeatedly adjusted by shifting it within the machine whenever it is necessary to change over from marking prices on single segment tags to multisegment tags and vice versa.

The multisegment tag 29 shown in FIG. 2 is attached to an article of merchandise in a conventional manner after both correlated segments 24, 25 and 26, 27 thereof have been severed. During the sales transaction, the segment 26, 27 can be used as cash receipt and can be read by machine. The embodiment of the tag 28 of my invention shown in FIG. 2 is provided with numerals 39 that are formed so as to be both visually and machine-readable. The numerals can, of course, also be in script form by providing suitable corresponding type on the printing rollers. Of course, alphabet characters can also be imprinted on the tags by providing such type on the printing rollers. Due to the mechanical severing of the tags 29 from the strip 28, the segments 26, 27 of the multisegment tags can be adjusted and oriented at least on three edges thereof within the reading machine (not shown) so that the reading or indicia-sensing member within the reading machine can satisfactorily carry out its intended function.

I claim:

1. Method of producing multisegment tags having indicia thereon that can be read both visually and by machine which comprises punching a hole in each of a multiplicity of adjacent segments of tag blanks connected to one another in a continuous strip formed with a continuous line of perforations extending longitudinally along the strip so as to define a continuous marginal edge portion at one side of said strip, the segments being severable along lines extending transversely to the longitudinal axis of the strip, also punching an open-ended slot extending to said line of perforations at said one side of said strip respectively between the holes punched in the adjacent segments and in alignment with respective severing lines so as to shorten the length of the respective severing lines and subdivide said marginal edge portion, threading a length of flexible strand through both of the holes punched in the adjacent segments of each tag blank and knotting the ends of the strand to form a loop extending across the slot located therebetween, thereafter performing at least one marking operation on the adjacent segments of the tag blanks, and severing along the lines the marked tag blank segments from one another and from the segments of the adjoining tag blanks in the strip, so that the segments of each tag blank remain connected to one another only by the flexible strand after the segments have been severed from the strip along the severing lines.

2. Method according to claim 1, which includes forming at least one transport hole on the respective lines spaced from the slots.

3. Method according to claim 1, wherein the strip is inserted into the printing mechanism of a price marking machine and the adjacent segments are imprinted therein and the strip is advanced to a severing device located in the price marking machine for severing the printed segments from one another.

4. Strip for use in producing multisegment tags having indicia thereon that can be read both visually and by machine, comprising a plurality of connected tag blanks each including a pair of adjacent segments respectively defined by lines extending across said strip substantially perpendicularly to the axial direction of said strip and along which there is disposed in alignment therewith an open-ended slot at one side of the strip and at least one transport hole spaced from said slot, said pair of adjacent segments being formed with a continuous line of said strip so as to define a continuous marginal edge portion at one side of said strip, said open-ended slot extending to said line of perforations so as to subdivide said marginal edge portion of said pair of adjacent segments, said segments being also formed at said one side of said strip with respective openings spaced from one another on opposite sides of the slot located between said adjacent segments, and a knotted loop of a flexible strand passing through said openings and extending across the slot therebetween.

References Cited

UNITED STATES PATENTS

| | | | |
|---|---|---|---|
| 1,332,421 | 3/1920 | Bogardus | 40—2 |
| 1,597,533 | 8/1926 | Meyers | 40—2UX |
| 2,937,464 | 5/1960 | Marshall | 40—2 |

FOREIGN PATENTS

| | | | |
|---|---|---|---|
| 509,083 | 1/1955 | Canada | 40—2 |

EUGENE R. CAPOZIO, Primary Examiner

W. J. CONTRERAS, Assistant Examiner